US011066958B2

(12) United States Patent
Karafillis et al.

(10) Patent No.: US 11,066,958 B2
(45) Date of Patent: Jul. 20, 2021

(54) CRUSHABLE SPACER AND BOLTED JOINT FOR A GAS TURBINE ENGINE

(71) Applicant: General Electric Company, Schenectady, NY (US)

(72) Inventors: Apostolos Pavlos Karafillis, Winchester, MA (US); Manoj Kumar Jain, Bangalore (IN); Thomas Chadwick Waldman, Boston, MA (US); Nagamohan Govinahalli Prabhakar, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/810,186

(22) Filed: Mar. 5, 2020

(65) Prior Publication Data

US 2020/0200045 A1    Jun. 25, 2020

Related U.S. Application Data

(62) Division of application No. 15/605,297, filed on May 25, 2017, now abandoned.

(51) Int. Cl.
*F01D 25/24* (2006.01)
*F01D 21/04* (2006.01)
(Continued)

(52) U.S. Cl.
CPC .......... *F01D 25/243* (2013.01); *F01D 21/045* (2013.01); *F01D 25/00* (2013.01); *F02C 7/00* (2013.01); *F05D 2260/311* (2013.01)

(58) Field of Classification Search
CPC ....... F01D 25/243; F01D 25/00; F01D 21/045
See application file for complete search history.

(56) References Cited

U.S. PATENT DOCUMENTS 5,259,728 A    9/1993    Szpunar et al.
6,283,639 B1    9/2001    Rode
(Continued)

FOREIGN PATENT DOCUMENTS

EP    2602434    6/2013
GB    774574    5/1957
WO    2013192558    12/2013

OTHER PUBLICATIONS

Technavio, "5 Major Benefits of Gas Turbines", 2016 (Year: 2016).*
(Continued)

*Primary Examiner* — Todd E Manahan
*Assistant Examiner* — Thuyhang N Nguyen
(74) *Attorney, Agent, or Firm* — Hanley, Flight & Zimmerman, LLC (57) ABSTRACT

A bolted joint apparatus includes: a first component including a first row of first bolt holes extending therethrough; a second component including a second row of second bolt holes extending therethrough wherein the second bolt holes are aligned coaxially with the first bolt holes, a plurality of fasteners, each of fasteners disposed through aligned pairs of the first and second bolt holes to couple together the first and second components, each of the fasteners including a shank; and crushable spacers disposed around the shanks of the fasteners, the crushable spacers clamped in compression between the fasteners and one of the components, wherein each of the crushable spacers has a tubular body interconnecting first and second enlarged ends, the tubular body being defined by a peripheral wall which incorporates at least one weakening feature.

16 Claims, 7 Drawing Sheets

(51) Int. Cl.
    *F02C 7/00*          (2006.01)
    *F01D 25/00*       (2006.01)

(56)            References Cited

U.S. PATENT DOCUMENTS

| | | |
|---|---|---|
| 6,793,398 B2 * | 9/2004 | Nahrwold .............. F16C 19/548 |
| | | 384/563 |
| 7,276,012 B2 | 10/2007 | Matsumoto et al. |
| 8,192,102 B2 | 6/2012 | Heidari et al. |
| 9,169,728 B2 | 11/2015 | Wallace et al. |
| 9,341,071 B2 | 5/2016 | Healy et al. |
| 10,113,602 B2 | 10/2018 | Stanescu |
| 2010/0129137 A1 * | 5/2010 | Heidari ................... F16B 43/00 |
| | | 403/2 |
| 2015/0354616 A1 | 12/2015 | Dimelow et al. |

OTHER PUBLICATIONS

China National Intellectual Property Administration, "First Office Action" issued in connection with application No. 201810560652.9 dated Sep. 20, 2019, translation included, 17 pages.
China National Intellectual Property Administration, "Second Office Action" issued in connection with application No. 201810560652.9, dated Jul. 20, 2020, translation included, 19 pages.
United States Patent and Trademark Office, "Restriction Requirement", issued in connection with U.S. Appl. No. 15/605,297 dated Aug. 22, 2019, 5 pages.
United States Patent and Trademark Office, "Non-Final Office Action", issued in connection with U.S. Appl. No. 15/605,297 dated Nov. 5, 2019, 12 pages.
China National Intellectual Property Administration, "Third Office Action" issued in connection with application No. 201810560652.9 dated Apr. 20, 2021, translation included, 12 pages.

* cited by examiner

CRUSHABLE SPACER AND BOLTED JOINT FOR A GAS TURBINE ENGINE

BACKGROUND OF THE INVENTION

This invention relates generally to bolted joints, and more specifically to bolted joints within gas turbine engines.

A gas turbine engine includes a turbomachinery core having a high-pressure compressor, combustor, and high pressure turbine in serial flow relationship. The core is operable in a known manner to generate a primary flow of propulsive gas. A typical turbofan engine adds a low-pressure turbine driven by the core exhaust gases which in turn drives a fan rotor through a shaft to generate a bypass flow of propulsive gas. In the case of a high bypass engine this provides the majority of the total engine thrust.

Bolted joints are used in several locations in a gas turbine engine. Each bolted joint includes abutting flanges which are held together by bolts or other fasteners through bolt holes provided in each of the flanges that are aligned with each other. During operation, the engine can experience unusual events such as the fracture and release of a fan blade ("FBO"). This can produce extreme stresses, forces, and deflection all over the engine. Large radial, tangential, or axial loads with respect to an axial centerline of the bolted joint can impose bending moments or tensile forces in the flange that can cause deformation or rupture of the bolts. It is an FAA certification requirement that during such an event the engine must retain its structural integrity, so that components do not strike other portions of an aircraft, or fall off of the aircraft.

In order to mitigate the forces on the engine, there are several locations within the engine which use "fused" connections. One type of fuse element is a crushable spacer, which is a small generally cylindrical device placed over the shank of a bolt and clamped together in a bolted joint. The spacer is able to resist the bolted joint preload while retaining structural integrity, but if an excessive load is incurred, the spacer will crush/fail thus relieving stress in adjoining components. Under the circumstances, if the crushable spacers fail the connected components will generally remain connected sufficiently to ensure a safe outcome, but if they retain their integrity they may transfer extreme forces to the surrounding components causing them to fail in unpredictable ways.

In the prior art, the crushable spacer is sized by selecting its wall thickness and material, which is typically a metal alloy. One problem with bolted joints using existing spacers is that is that the force/deflection characteristics are undesirable. Specifically, there is a region of elastic deflection, followed by yielding, followed by eventual tensile failure. In operation, there can be a large difference in the load required to produce elastic deflection and the load required to produce failure. The crushable spacer can experience a very large degree of yielding before spacer column buckling occurs. The net effect is that the spacer fails in a drawn-out fashion and that a plurality of spacers subjected to an overload can often fail inconsistently at different times. This defeats the purpose of the crushable spacer.

BRIEF DESCRIPTION OF THE INVENTION

This problem is addressed by a bolted joint incorporating a crushable spacer having a peripheral wall incorporating at least one weakening feature.

According to one aspect of the technology described herein, a bolted joint apparatus includes: a first component having a first flange including a first row of first bolt holes extending therethrough; a second component having a second flange including a second row of second bolt holes extending therethrough wherein the second bolt holes are aligned coaxially with the first bolt holes, a plurality of fasteners, each of the fasteners disposed through aligned pairs of the first and second bolt holes to couple together the first and second flanges, each of the fasteners including a shank; and crushable spacers disposed around the shanks of the fasteners, the crushable spacers clamped in compression between the fasteners and one of the flanges, wherein each of the crushable spacers has a tubular body including a central portion interconnecting first and second enlarged ends, the tubular body being defined by a peripheral wall which incorporates at least one weakening feature.

According to another aspect of the technology described herein, a gas turbine engine includes: turbomachinery components including a fan, a compressor, a compressor, a combustor, and a turbine arranged in serial flow relationship and circumscribed about an engine centerline axis; and a supporting static structure circumscribing the turbomachinery components; wherein at least one of the turbomachinery components and the static structure include a bolted flange assembly, including: a first component having a first flange including a first row of first bolt holes extending therethrough; a second component having a second flange including a second row of second bolt holes extending therethrough, wherein the second bolt holes are aligned coaxially with the first bolt holes; a plurality of fasteners, each of the fasteners disposed through aligned pairs of the first and second bolt holes to couple together the first and second flanges, each of the fasteners including a shank; and crushable spacers disposed around the shanks of the fasteners, the crushable spacers clamped in compression between the fasteners and one of the flanges, wherein each of the crushable spacers has a tubular body including a central portion interconnecting first and second enlarged ends, the tubular body being defined by a peripheral wall which incorporates at least one weakening feature which does not pass completely through the peripheral wall.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
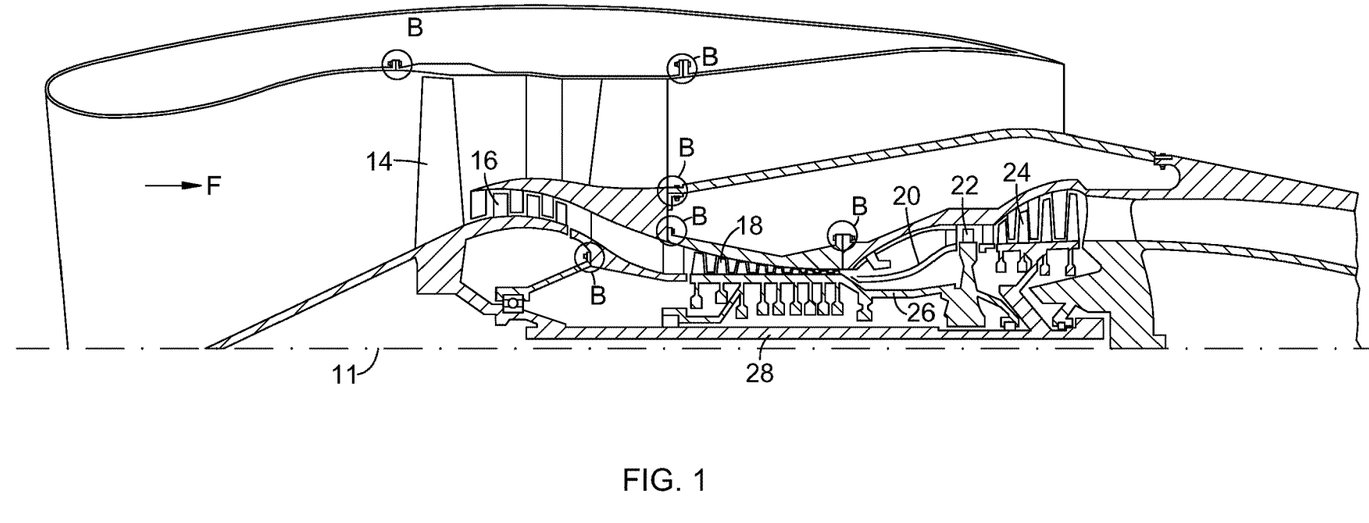
FIG. 1 is a schematic half-sectional view of a gas turbine engine.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc. The engine 10 has a longitudinal center line or axis 11 and an outer stationary annular core casing disposed concentrically about and coaxially along the axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 14 and booster 16 via an inner shaft 28. The engine 10 incorporates numerous bolted joints at several locations. Examples of potential bolted joints are in the circled areas in FIG. 1, labeled "B".

Some non-limiting examples of locations where fused bolted joints would be used are as follows: In a fan load reduction device ("LRD"); In a "backbone" joint between two annular portions of an engine casing (e.g. compressor case to combustor case); In a joint between a composite and metal components, for example between a fan case and a fan inlet; In future applications, it is desirable to use this type of joint and other locations such as between a fan hub frame and a core cowl, where one of the components may be composite such as ceramic matrix composite or polymeric matrix composite.

Figure 2:
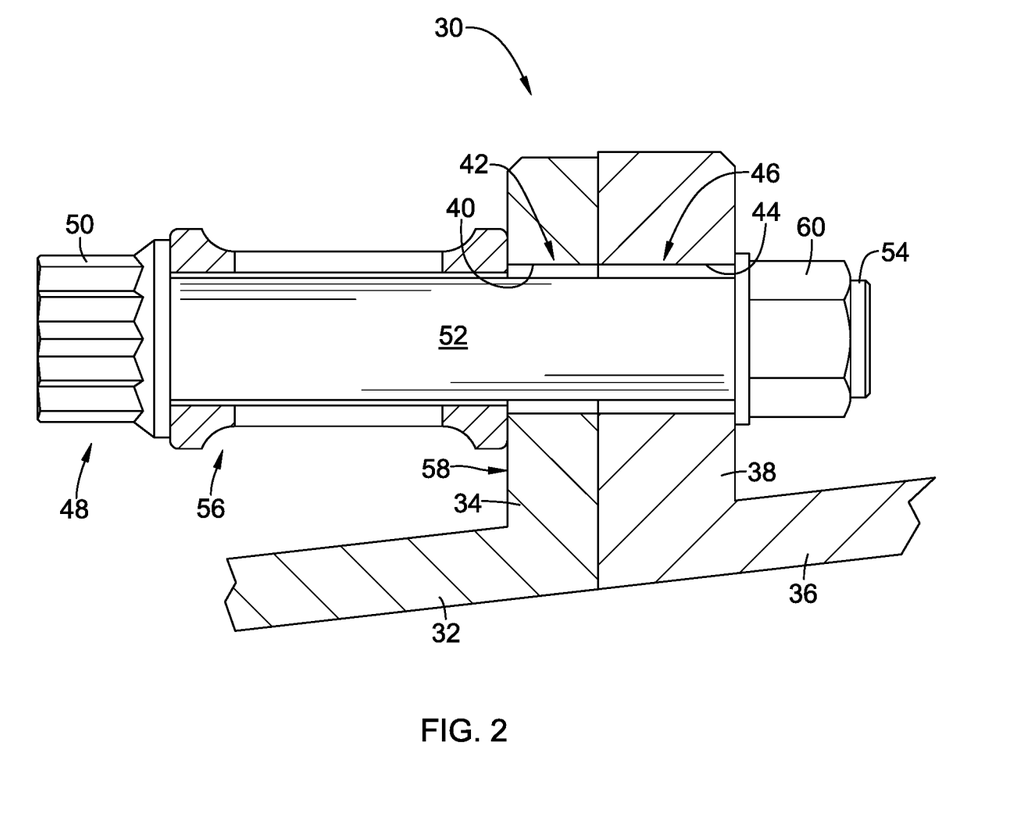
FIG. 2 is a schematic cross-sectional view of a bolted joint of the engine of FIG. 1.

FIG. 2 illustrates a bolted joint 30 which is generally representative of any of the bolted joints described above. A first component 32 (a portion of which is shown) includes a first flange 34. A second component 36 (a portion of which is shown) includes a second flange 38. In the illustrated example, each of the first and second components 32, 36 is a body of revolution about the centerline axis 11; however, this need not be the case.

The first flange 34 incorporates at least one first bolt hole 40; for example, a ring or row 42 of first bolt holes 40 may be provided. The second flange 38 includes at least one second bolt hole 44; for example, a ring or row 46 of second bolt holes 44 may be provided. The first flange 34 abuts the second flange 38 such that the first bolt holes 40 are aligned coaxially with the second bolt holes 44.

Bolts 48 are disposed through the first bolt holes 40 and the second bolt holes 44. Each of the bolts 48 includes a bolt head 50, a shank 52, and a thread 54.

Crushable spacers 56, described in more detail below, are disposed around the shanks 50 of the bolts 48. The crushable spacers 56 contact and axially extend between the bolt heads 50 and a first annular surface 58, preferably flat, of the first flange 34. Nuts 60 are provided having internal threads which engage the threads 54 of the bolt 48 and are tightened to provide a desired clamping load on the bolted joint 30, clamping the crushable spacers 56 in compression. It will be understood that the crushable spacers 56 could alternatively be placed on the other side of the bolted joint 30, that is, between the second flange 38 and the nuts 60.

It will be understood that the bolts 48 could be replaced with any fastener capable of clamping together the first flange 34, the second flange 38, and the crushable spacer 56 with a predetermined clamping load.

For example, instead of using the bolts 48 with nuts 60, one of the flanges 34, 38 could be provided with internal threads (not shown) to engage the threads 54 of the bolt 48. These could be formed, for example by a thread-cutting operation or by the installation of a threaded insert into one of the flanges 34, 38.

As another example, instead of using the illustrated bolts 48 and nuts 60, a threaded stud with nuts secured to both ends (not shown) could be used.

As yet another example, instead of using the illustrated bolts 48 and nuts 60, a fastener such as a conventional rivet or blind rivet (not shown) could be used.

Figure 3:
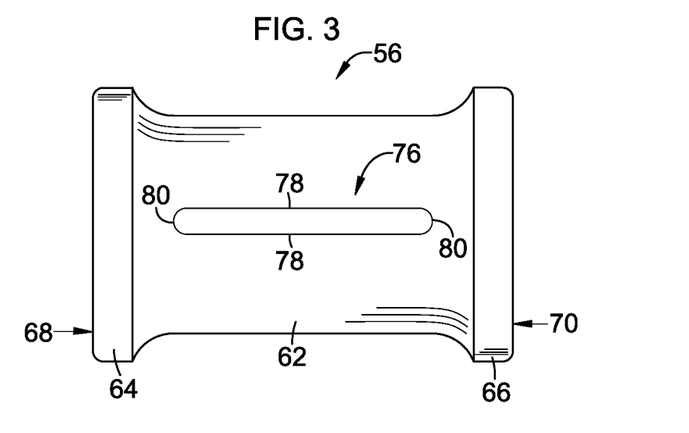
FIG. 3 is a side elevation view of a crushable spacer of the bolted joint.
Figure 4:
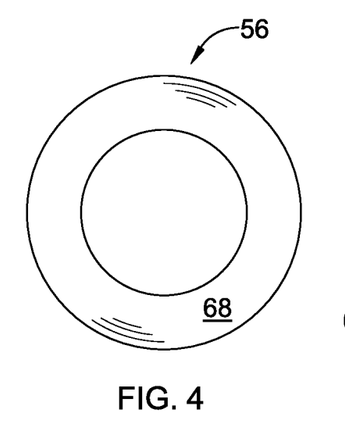
FIG. 4 is an end view of the crushable spacer of FIG. 3.
Figure 5:
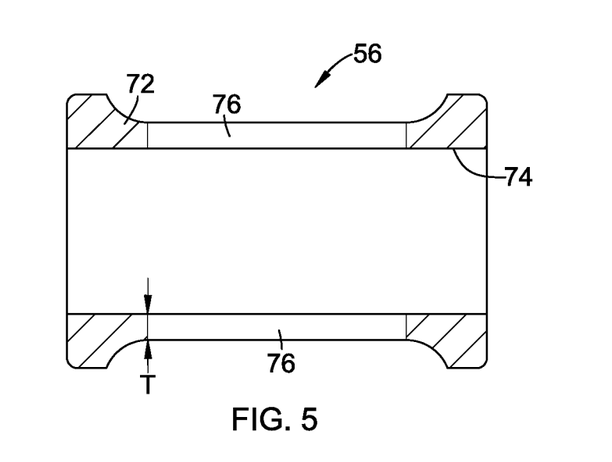
FIG. 5. is a cross-sectional view of the crushable spacer of FIG. 3.

FIGS. 3-5 show one of the crushable spacers 56 in more detail. The crushable spacer 56 has a body including a central portion 62 extending axially between and interconnecting first and second enlarged or flanged ends 64, 66. The first and second ends 64, 66, define first and second end faces 68, 70 respectively, which may be planar.

The crushable spacer 56 has a peripheral wall 72 defining a hollow interior or through-bore 74. The body of the crushable spacer 56 may thus be generally described as a "tubular" form. In the illustrated example the peripheral wall 72 is cylindrical or a body of revolution. Other cross-sectional shapes, such as regular or irregular polygons, could be used as well.

The peripheral wall 72 has a basic thickness "T" selected to have particular strength characteristics as described in more detail below. The peripheral wall 72 further includes at least one weakening feature. As used herein, the term "weakening feature" refers to a feature which reduces the buckling strength or critical load of the crushable space 56, as compared to a cylindrical wall of uniform basic thickness T.

The peripheral wall 72 includes a weakening feature embodied as at least one opening formed therein. This opening may take numerous forms. In the example illustrated in FIGS. 3-5, the opening takes the form of one or more elongated slots 76 passing completely through the thickness of the peripheral wall 72 and having parallel sides 78 joined by rounded ends 80.

The characteristics of the openings, including their number, shape, location, and dimensions, may be varied to suit a particular application. For example, the openings could take the form of singular or plural circular holes, or spiral slots (not shown). Optionally, the openings could be "blind"

openings which do not pass all the way through the thickness of the peripheral wall 72. In general, it is preferable that the cross-sectional area remaining in the peripheral wall 72 be suitable to withstand the desired compressive force due to bolt preload forces as well as expected forces during normal operation, but that the buckling strength be reduced.

The material selected for the crushable spacer 56 should have a generally high tensile strength and a ratio of ultimate tensile strength ("UTS") to yield strength ("YS") strength as low as possible. The crushable spacer 56 should be sized for yield strength YS at assembly clamp load, and the buckling is based on an ultimate tensile strength UTS for the load expected at an event such as blade out. The lower the ratio of UTS/YS, the lower the flange load (past flange separation) needed to crush the crushable spacer 56 in a manner such that rapid predictable failure will occur when loads exceed a predetermined stress, without a significant amount of yielding. The presence of a weakening feature as described herein further contributes to buckling and rapid predictable failure.

The openings described above are one example of a weakening feature. the specific mechanical design of the crushable spacer 56 may be varied to suit a particular application, and different types of weakening features may be implemented.

Figure 6:
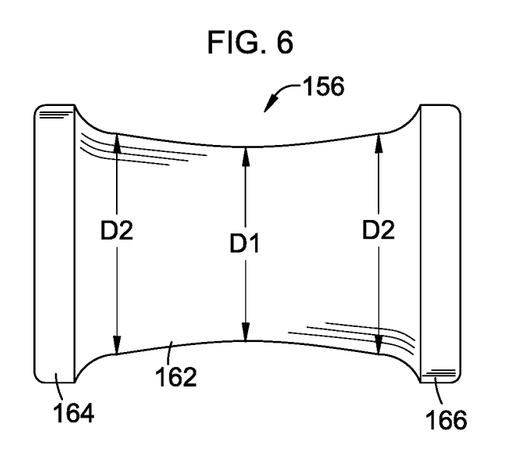
FIG. 6 is a side elevation view of an alternative crushable spacer.
Figure 7:
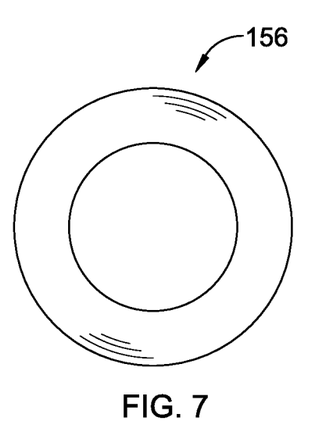
FIG. 7 is an end view of the crushable spacer of FIG. 7.
Figure 8:
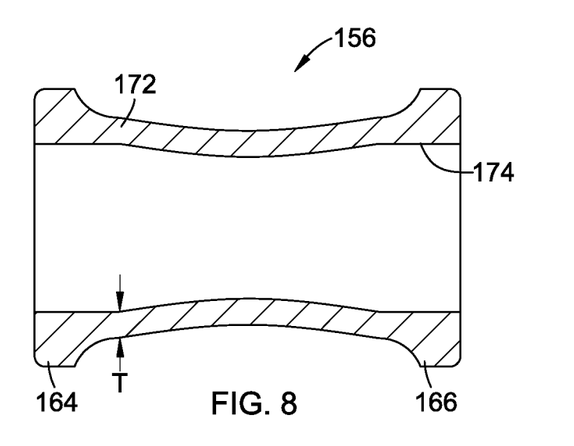
FIG. 8 is a cross-sectional view of the crushable spacer of FIG. 7.

For example, FIGS. 6-8 illustrate an alternative crushable spacer 156 similar in construction to the crushable spacer 56 described above. The crushable spacer 156 has a body including a central portion 162 extending axially between and interconnecting first and second enlarged or flanged ends 164 and 166. The crushable spacer 156 has a peripheral wall 172 defining a hollow interior or through-bore 174. As noted above, this may be generally described as a "tubular" form. In the illustrated example the peripheral wall 172 is cylindrical or body of revolution. Other cross-sectional shapes, such as regular or irregular polygons, could be used as well.

The peripheral wall 172 has a basic thickness "T" selected as described above. The peripheral wall 172 incorporates an "hourglass shape" wherein the wall pinches inward such that an outer diameter "D1" near the center of the peripheral wall 172 is less than a diameter "D2" near the flanged ends 164, 166. This hourglass shape contributes to a reduced buckling strength as described above and may be considered a weakening feature. In addition to the hourglass shape described above, the crushable spacer 156 may incorporate one or more openings as described above.

Figure 9:
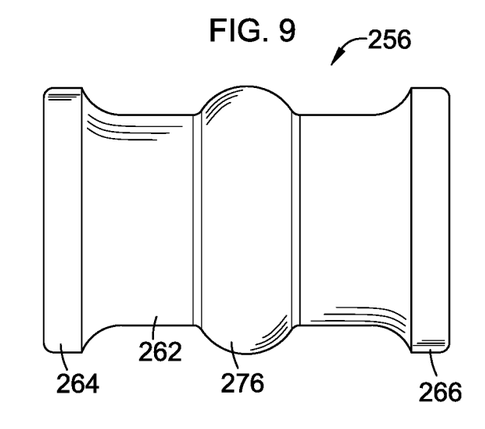
FIG. 9 is a side elevation view of another alternative crushable spacer.
Figure 10:
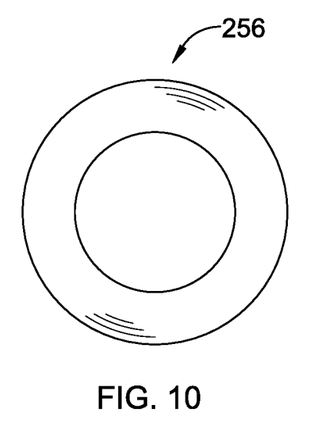
FIG. 10 is an end view of the crushable spacer of FIG. 9.
Figure 11:
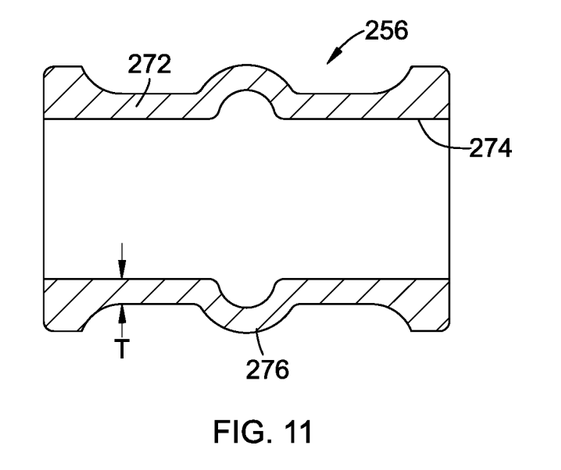
FIG. 11 is a cross-sectional view of the crushable spacer of FIG. 10.

FIGS. 9-11 illustrate another alternative crushable spacer 256. The crushable spacer 256 has a body including a central portion 262 extending axially between and interconnecting first and second enlarged or flanged ends 264 and 266. The crushable spacer 256 has a peripheral wall 272 defining a hollow interior or through-bore 274. As noted above, this may be generally described as a "tubular" form. In the illustrated example the peripheral wall 272 is cylindrical or body of revolution. Other cross-sectional shapes, such as regular or irregular polygons, could be used as well.

Figure 15:
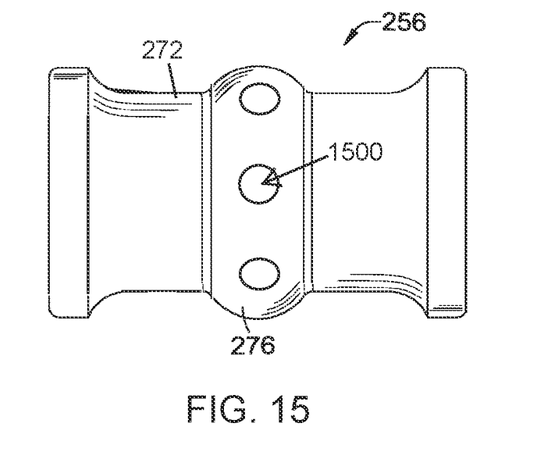
FIG. 15 is a side elevation view of the crushable spacer of FIG. 12 having a plurality of circular holes.

The peripheral wall 272 has a basic thickness "T" selected as described above. The peripheral wall 272 incorporates at least one "kink" 276, defined herein as a discontinuity in the axial direction. In the illustrated example, the kink 276 takes the form of a generally semicircular annular bulge located near the center of the peripheral wall 272. The presence of the kink 276 contributes to a low buckling strength as described above. Optionally, in addition to the hourglass shape described above, the crushable spacer 256 may incorporate at least one opening as described above. FIG. 15 illustrates the crushable spacer 256 including the peripheral wall 272 having the kink 276 and a plurality of circular holes 1500 (one of which is referenced in FIG. 15) extending through the peripheral wall 272.

Figure 12:
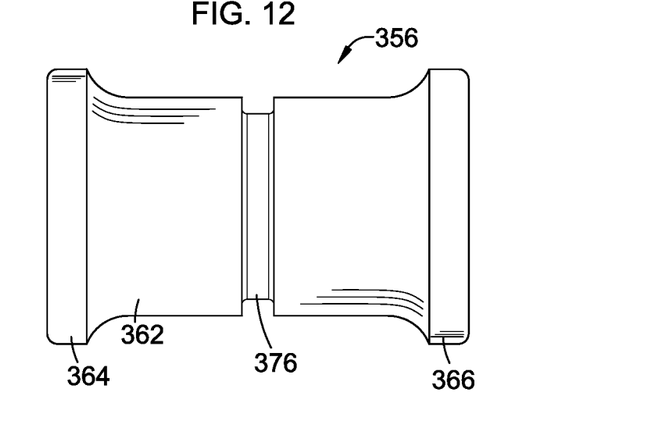
FIG. 12 is a side elevation view of another alternative crushable spacer.
Figure 13:
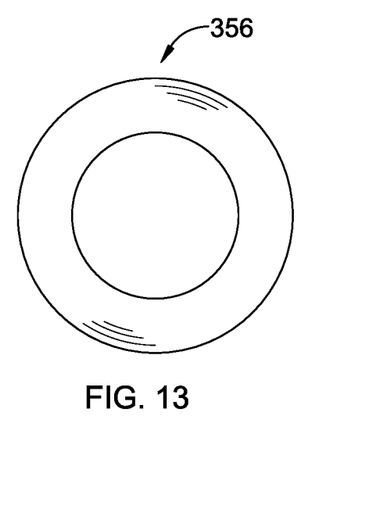
FIG. 13 is an end view of the crushable spacer of FIG. 12.
Figure 14:
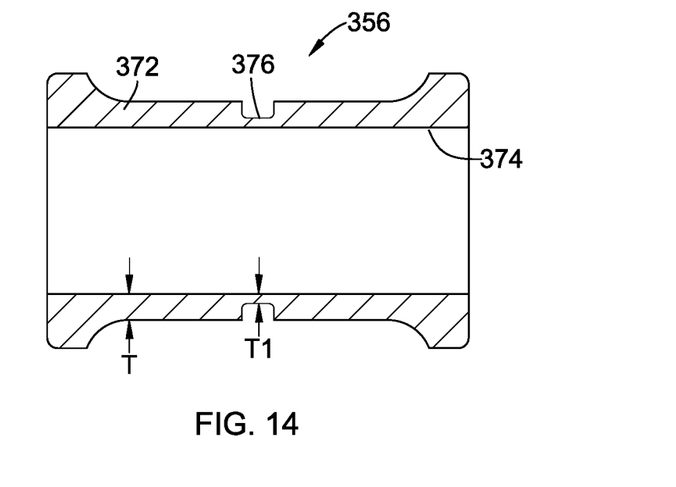
FIG. 14 is a cross-sectional view of the crushable spacer of FIG. 13.

FIGS. 12-14 illustrate another alternative crushable spacer 356. The crushable spacer 356 has a body including a central portion 362 extending axially between and interconnecting first and second enlarged or flanged ends 364 and 366. The crushable spacer 356 has a peripheral wall 372 defining a hollow interior or through-bore 374. As noted above, this may be generally described as a "tubular" form. In the illustrated example the peripheral wall 372 is cylindrical or body of revolution. Other cross-sectional shapes, such as regular or irregular polygons, could be used as well.

The peripheral wall 372 has a basic thickness "T" selected as described above. The peripheral wall 372 incorporates at least one discrete thin section 376 having a thickness "T1" which is less than the basic thickness T. The presence of the discrete thin section 376 contributes to a low buckling strength as described above. In the illustrated example the thin section 376 is configured as an annular ring, but other orientations such as axial or oblique are possible as well. Optionally, in addition to the thin section described above, the crushable spacer 356 may incorporate at least one opening as described above (not shown).

The foregoing has described a crushable spacer and a bolted joint using a crushable spacer for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A bolted joint apparatus, comprising:
a first component including a first row of first bolt holes extending therethrough;
a second component including a second row of second bolt holes extending therethrough, wherein the second bolt holes are aligned coaxially with the first bolt holes,
a plurality of fasteners, each of the fasteners disposed through aligned pairs of the first and second bolt holes to couple together the first and second components, each of the fasteners including a shank; and
crushable spacers disposed around respective ones of the shanks of the fasteners, the crushable spacers clamped in compression between the fasteners and one of the components, wherein each of the crushable spacers has a tubular body including a central portion interconnecting first and second enlarged ends, the tubular body being defined by a peripheral wall that incorporates at least one weakening feature, the at least one weakening feature including a plurality of circular holes extending through the peripheral wall and a semicircular annular bulge located near a center of the peripheral wall.

2. The apparatus of claim 1 wherein the fasteners include bolts, each of the bolts including a bolt head, a thread, and a shank therebetween.

3. The apparatus of claim 2 further including a plurality of nuts, each of the nuts engaging the thread of one of the bolts.

4. The apparatus of claim 1 wherein the at least one weakening feature includes an hourglass shape of the peripheral wall.

5. The apparatus of claim 1 wherein the peripheral wall has a first diameter near a center of the peripheral wall and a second diameter near at least one of the first and second enlarged ends, wherein the first diameter is less than the second diameter.

6. The apparatus of claim 1 wherein the at least one weakening feature includes a discrete thin section in the peripheral wall.

7. The apparatus of claim 6 wherein the thin section is configured as an annular band.

8. The apparatus of claim 1 wherein the at least one weakening feature includes a discrete thin section in the peripheral wall having a first thickness which is less than a second thickness of the peripheral wall.

9. A gas turbine engine, comprising: turbomachinery components including a fan, a compressor, a combustor, and a turbine arranged in serial flow relationship and circumscribed about an engine centerline axis; and a supporting static structure circumscribing the turbomachinery components; wherein at least one of the turbomachinery components and the static structure include a bolted flange assembly, including:
a first component having a first flange including a first row of first bolt holes extending therethrough;
a second component having a second flange including a second row of second bolt holes extending therethrough, wherein the second bolt holes are aligned coaxially with the first bolt holes;
a plurality of fasteners, each of the fasteners disposed through aligned pairs of the first and second bolt holes to couple together the first and second flanges, each of the fasteners including a shank; and
crushable spacers disposed around respective ones of the shanks of the fasteners, the crushable spacers clamped in compression between the fasteners and one of the flanges, wherein each of the crushable spacers includes a tubular body extending axially between first and second enlarged ends, the tubular body being defined by a peripheral wall that incorporates at least one weakening feature, the at least one weakening feature including a plurality of circular holes passing through a thickness of the peripheral wall and a semicircular annular bulge located near a center of the peripheral wall.

10. The engine of claim 9 wherein the fasteners include bolts, each of the bolts including a bolt head, a thread, and a shank therebetween.

11. The engine of claim 10 further including a plurality of nuts, each of the nuts engaging the thread of one of the bolts.

12. The engine of claim 9 wherein the at least one weakening feature includes an hourglass shape of the peripheral wall.

13. The apparatus of claim 9 wherein the peripheral wall has a first diameter near a center of the peripheral wall and a second diameter near at least one of the first and second enlarged ends, wherein the first diameter is less than the second diameter.

14. The engine of claim 9 wherein the at least one weakening feature includes a discrete thin section in the peripheral wall.

15. The engine of claim 14 wherein the thin section is configured as an annular band.

16. The apparatus of claim 9 wherein the at least one weakening feature includes a discrete thin section in the peripheral wall having a first thickness which is less than a second thickness of the peripheral wall.

* * * * *